(12) United States Patent
Hashiguchi et al.

(10) Patent No.: US 11,715,374 B2
(45) Date of Patent: Aug. 1, 2023

(54) VEHICLE PARKING POSITION NOTIFICATION SYSTEM

(71) Applicant: Mazda Motor Corporation, Hiroshima (JP)

(72) Inventors: Hironobu Hashiguchi, Aki-gun (JP); Takashi Iwase, Aki-gun (JP); Akira Yasutake, Aki-gun (JP); Tsuyoshi Arinaga, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 170 days.

(21) Appl. No.: 17/197,174

(22) Filed: Mar. 10, 2021

(65) Prior Publication Data

US 2021/0366282 A1 Nov. 25, 2021

(30) Foreign Application Priority Data

May 19, 2020 (JP) ................................. 2020-087615

(51) Int. Cl.
*G08G 1/127* (2006.01)
*G05D 1/00* (2006.01)
*G05D 1/10* (2006.01)

(52) U.S. Cl.
CPC ........... *G08G 1/127* (2013.01); *G05D 1/0033* (2013.01); *G05D 1/101* (2013.01)

(58) Field of Classification Search
CPC ....... G08G 1/127; G05D 1/0033; G05D 1/101
See application file for complete search history.

(56) References Cited

U.S. PATENT DOCUMENTS

| 10,370,102 B2 * | 8/2019 | Boykin ................ H04N 21/435 |
| 10,496,107 B2 * | 12/2019 | Pattison .................. H04W 4/02 |
| 2020/0005641 A1 * | 1/2020 | Park ...................... G08G 1/168 |

FOREIGN PATENT DOCUMENTS

| CN | 104766490 | * | 4/2015 |
| JP | 2016095559 A | * | 5/2016 |
| JP | 2016-138853 A |  | 8/2016 |
| JP | 2016138853 | * | 1/2017 |
| JP | 2017-227946 A |  | 12/2017 |

OTHER PUBLICATIONS

Office Action dated Apr. 20, 2023 in Chinese Patent Application No. 202110259868.3, 8 pages. (with English Abstract).

* cited by examiner

*Primary Examiner* — Curtis A Kuntz
*Assistant Examiner* — James E Munion
(74) *Attorney, Agent, or Firm* — Xsensus LLP

(57) ABSTRACT

When a start condition determined in advance is satisfied while a vehicle is parked, a controller controls an aircraft such that the aircraft takes off from the vehicle, a photographing unit captures a position notification image including at least the vehicle and notifying a parking position of the vehicle, and the position notification image is transmitted to a mobile terminal having a display unit and carried by a user outside the vehicle.

17 Claims, 8 Drawing Sheets

VEHICLE PARKING POSITION NOTIFICATION SYSTEM

CROSS-REFERENCE TO RELATED APPLICATION

The present application claims priority to Japanese App. No. 2020-087615, filed May 19, 2020, the entire contents of which being incorporated herein by reference in its entirety.

TECHNICAL FIELD

The present invention relates to a vehicle parking position notification system.

BACKGROUND ART

When a vehicle is parked in a large parking lot in a large commercial facility or the like, a user may forget a precise parking position of an own vehicle when returning to the vehicle after leaving the vehicle once.

JP 2016-138853 A discloses that when a vehicle is parked in a large parking lot and a door of the vehicle is unlocked by a keyless entry system, an aircraft is utilized as a mark of a position of the own vehicle by flying an aircraft mounted on the vehicle.

However, because the aircraft mounted on the vehicle is generally considered to be small, it is difficult to visually recognize the aircraft by simply flying the aircraft in the large parking lot when the user is positioned far away from the vehicle.

SUMMARY OF INVENTION

The present invention has been made in view of such circumstances, and an object of the present invention is to obtain a vehicle parking position notification system capable of reliably notifying a user of a parking position of a vehicle when the vehicle is parked in a large parking lot.

A vehicle parking position notification system according to one aspect of the present invention includes an aircraft mounted on a vehicle, having a photographing unit, and configured to fly outside the vehicle, and a controller configured to control the aircraft, in which when a start condition determined in advance is satisfied while the vehicle is parked, the controller controls the aircraft to take off from the vehicle, controls the photographing unit to capture a position notification image including at least the vehicle and notifying a parking position of the vehicle, and controls the position notification image to be transmitted to a mobile terminal having a display unit and carried by a user outside the vehicle.

DESCRIPTION OF EMBODIMENTS

Figure 1:
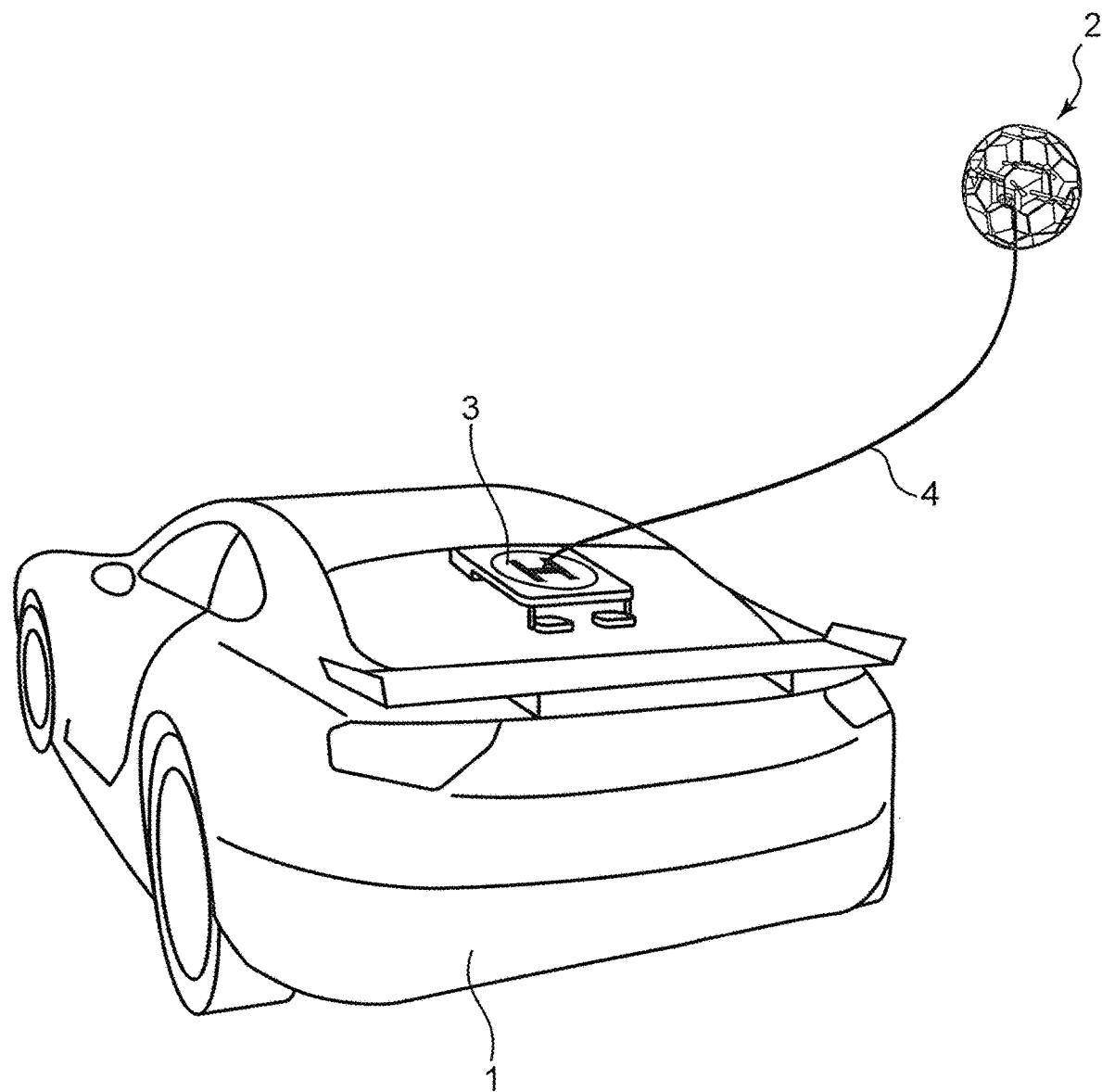
FIG. 1 is a diagram showing an application example of a parking position notification system according to an embodiment of the present invention.

Hereinafter, an embodiment of the present invention will be described in detail with reference to the drawings. The elements with the same reference numerals in different drawings indicate the same or corresponding elements.

FIG. 1 is a diagram showing an application example of a parking position notification system according to the embodiment of the present invention. The vehicle 1 is equipped with an aircraft 2 capable of flying outside the vehicle 1. The landing platform 3 of the aircraft 2 is disposed at a predetermined position (on a rear windshield in this example) of the vehicle 1. The landing platform 3 has a horizontal launching and landing surface for the aircraft 2 to take off and land. A windup reel 19 (not shown in FIG. 1) is disposed below the launching and landing surface. The windup reel 19 has a rotating shaft (not shown) around which a tether 4 as a power feeding cable is wound. A through hole is provided in a substantially center of the launching and landing surface, and the tether 4 wound around the rotating shaft of the windup reel 19 is inserted into the through hole and drawn out above the launching and landing surface to be connected to the aircraft 2.

Figure 2:
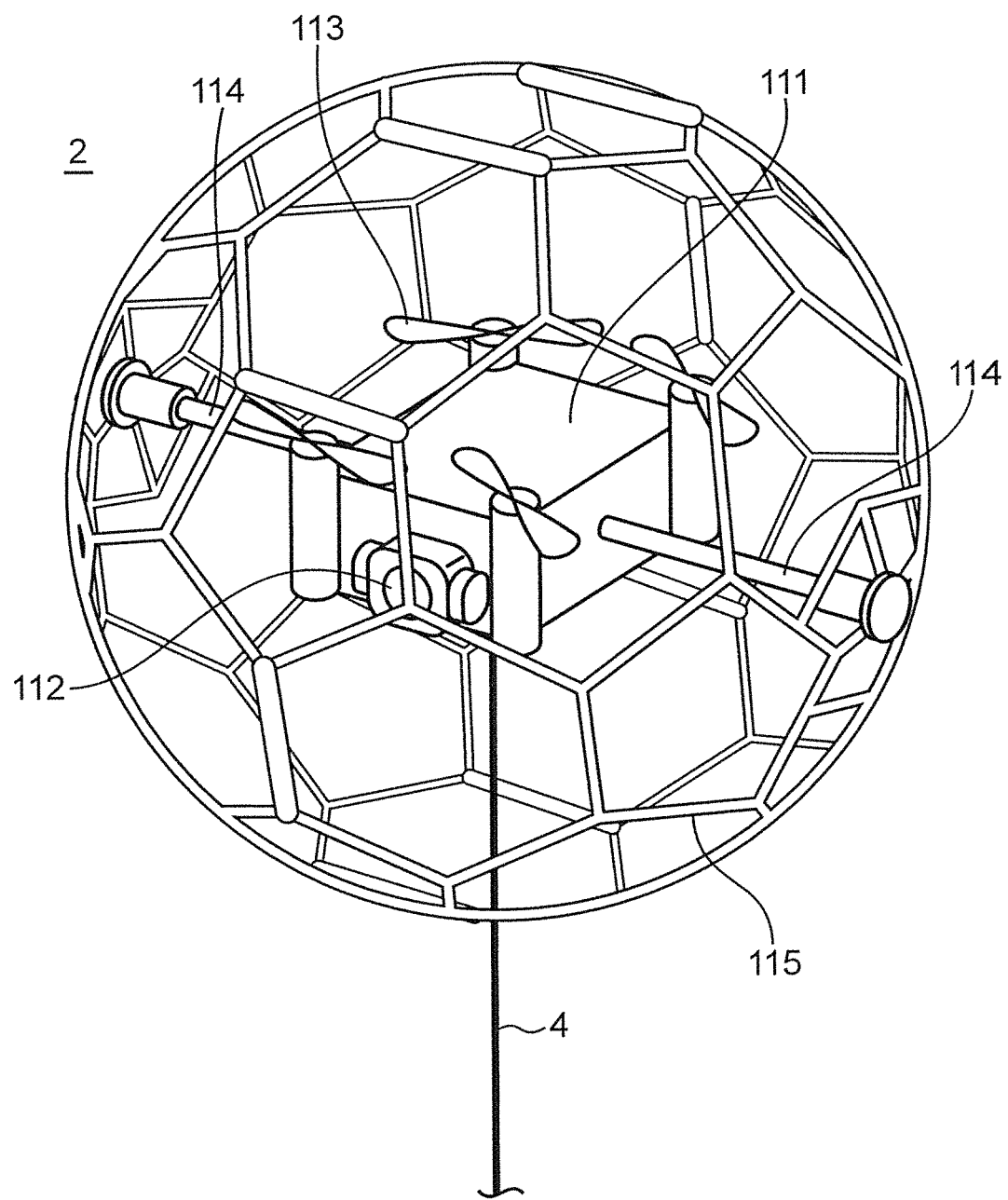
FIG. 2 is a diagram schematically showing appearance of an aircraft.

FIG. 2 is a diagram schematically showing appearance of the aircraft 2. The aircraft 2 is configured as a so-called quadcopter drone. The aircraft 2 includes a body 111, a camera 112 disposed on a front face of the body 111, propellers 113 disposed at four corners of the body 111, a pair of shafts 114 extending orthogonally to both left and right faces of the body 111, and a mesh spherical cushioning member 115 enclosing the body 111. The body 111 and the cushioning member 115 are fixed to each other by the shaft 114. The tether 4 is connected to a bottom face of the body 111.

Figure 3:
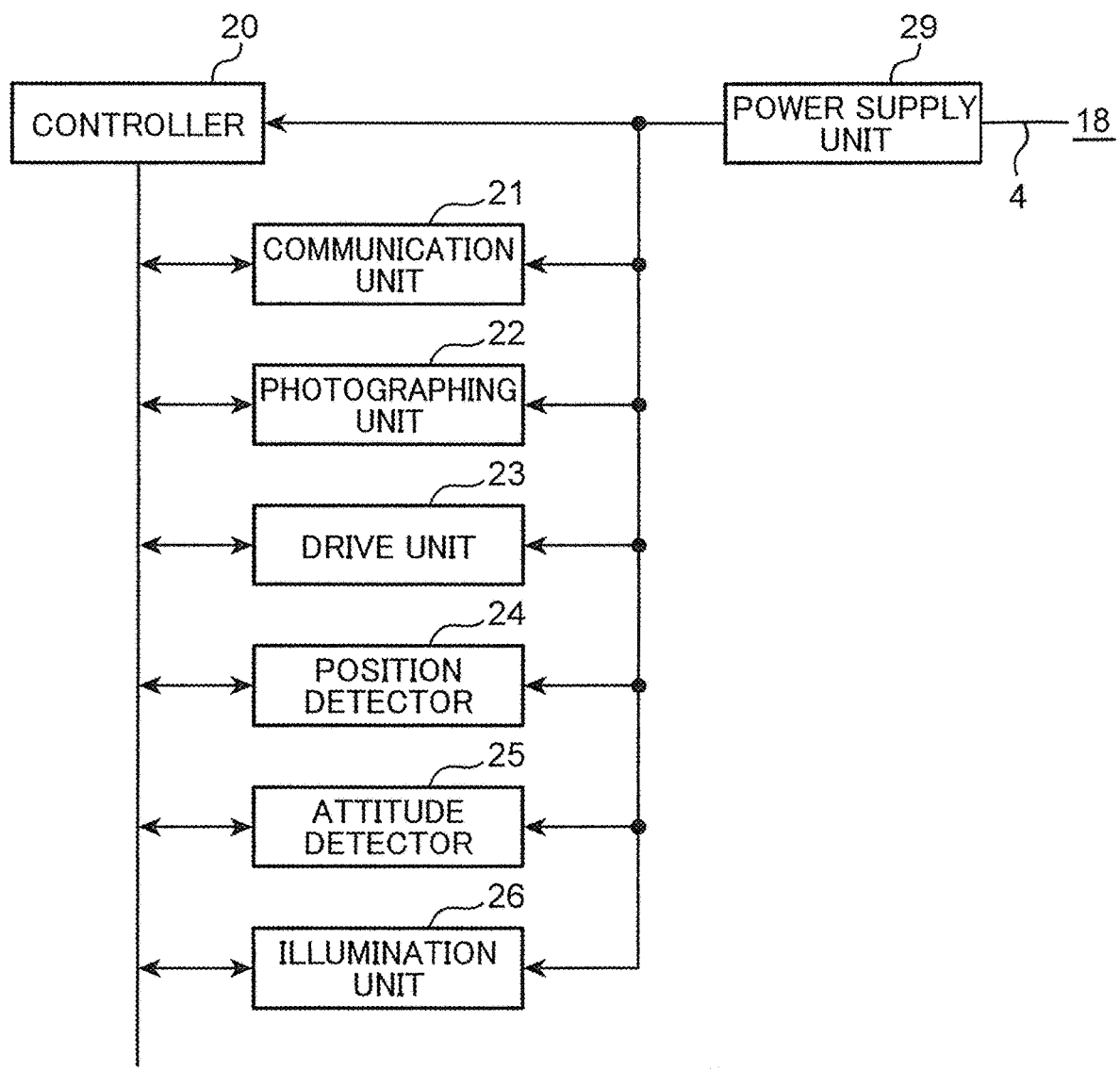
FIG. 3 is a block diagram showing a functional configuration of the aircraft.

FIG. 3 is a block diagram showing a functional configuration of the aircraft 2. As shown in FIG. 3, the aircraft 2 has a communication unit 21, a photographing unit 22, a drive unit 23, a position detector 24, an attitude detector 25, and an illumination unit 26. Further, the aircraft 2 has a controller 20 that administers total control of the aircraft 2 by controlling operations of these processors. Further, the aircraft 2 has a power supply unit 29 that supplies driving power to these processors and the controller 20. The power supply unit 29 is connected to the tether 4. By supplying the driving power of the aircraft 2 from the vehicle 1 via the tether 4, mounting of the battery in the aircraft 2 can be omitted, thereby reducing a weight of the aircraft 2. A total weight of the aircraft 2 is less than a weight limit (for example, 200 grams) subject to flight restrictions.

The communication unit 21 performs bidirectional data communication with the communication unit 122 of the vehicle 1, which will be described later, by a short-range wireless communication system such as Bluetooth (registered trademark). However, by adding a data communication line in the tether 4, the communication unit 21 and the communication unit 122 may be configured to wire communicate with each other via the data communication line.

The photographing unit 22 includes the camera 112 shown in FIG. 2. An image captured by the photographing unit 22 includes both a still image (photograph) and a moving image (video). In the following description, a case where a video is captured by the photographing unit 22 will be exemplified. The photographing unit 22 stores video data of the video captured by the camera 112 on a recording medium such as a flash memory and outputs the video data in real time. The video data may be stored in the vehicle 1.

The drive unit 23 includes a motor for driving a propeller shaft of the propellers 113 shown in FIG. 2 to rotate. The drive unit 23 individually controls a rotation direction and rotation speed of the four propellers 113. As a result, the aircraft 2 can perform arbitrary flight operations such as forward movement, backward movement, ascent, descent, turning, and hovering.

The position detector 24 includes a GPS receiver, an altitude sensor, and the like, detects a position of the aircraft 2 in real time, and outputs position data indicating the detected position.

The attitude detector 25 includes an acceleration sensor, a gyro sensor, a direction sensor, and the like, and detects an attitude of the aircraft 2 in real time, and outputs attitude data indicating the detected attitude.

The illumination unit 26 includes any illumination device such as an LED disposed on at least one face including the front face of the body 111 of the aircraft 2.

The controller 20 transmits the video data output from the photographing unit 22, the position data output from the position detector 24, and the attitude data output from the attitude detector 25 from the communication unit 21 to the vehicle 1 in real time.

Figure 4:
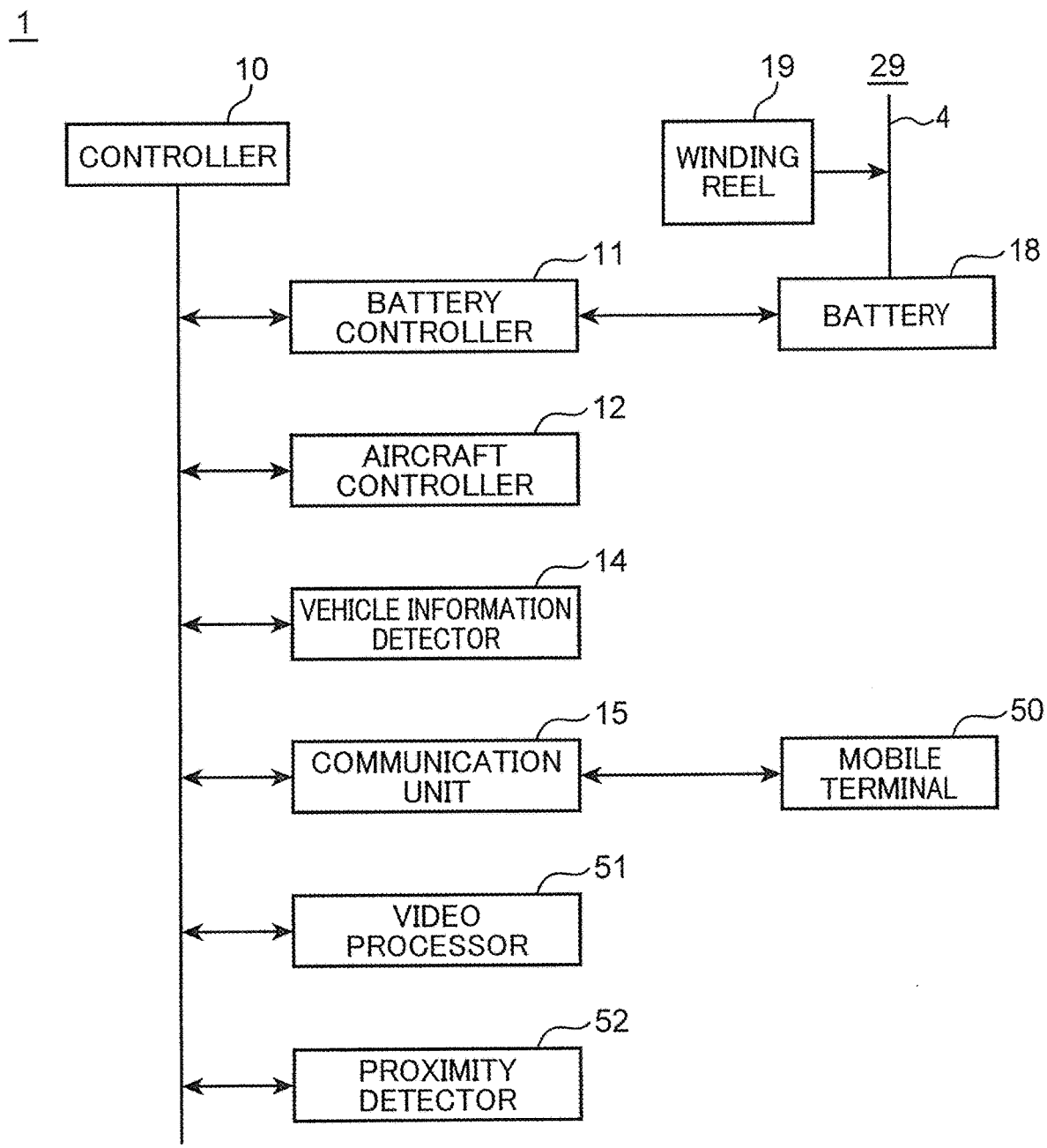
FIG. 4 is a block diagram showing a functional configuration of a vehicle.

FIG. 4 is a block diagram showing a functional configuration of the vehicle 1. As shown in FIG. 4, the vehicle 1 has a battery controller 11, an aircraft controller 12, a vehicle information detector 14, a communication unit 15, a video processor 51, and a proximity detector 52. Further, the vehicle 1 has a controller 10 that administers total control of the vehicle 1 by controlling operations of these processors. Further, the vehicle 1 has a battery 18 that supplies driving power to these processors and the controller 10. The tether 4 is connected to the battery 18. Further, the vehicle 1 has the windup reel 19. The driving power of the windup reel 19 is supplied from the battery 18. The windup reel 19 has the rotating shaft (not shown) around which the tether 4 is wound, and a motor (not shown) for driving the rotating shaft to rotate. The windup reel 19 controls feed and collection of the tether 4 by driving the rotating shaft by the motor such that an appropriate amount of the tether 4 according to a flight condition of the aircraft 2 is fed from the rotating shaft.

The battery controller 11 controls charging and discharging operations of the battery 18. Further, the battery controller 11 controls start and stop of power supply from the battery 18 to the tether 4.

The aircraft controller 12 controls a flight of the aircraft 2. The aircraft controller 12 will be described later in detail.

The vehicle information detector 14 detects various types of information of the vehicle 1. The vehicle information detector 14 will be described later in detail.

The communication unit 15 performs bidirectional data communication with a mobile terminal 50 of a user registered in advance by any wireless communication system such as Bluetooth (registered trademark), wireless LAN, or public telephone line network. The mobile terminal 50 is a smartphone, a mobile phone, a tablet, a laptop computer, a smart key, or the like, and has a display unit (such as an LCD or an organic EL) and a position detector (such as a GPS receiver).

The video processor 51 acquires position information of the vehicle 1 from a GPS receiver 148 (FIG. 6) of the vehicle information detector 14, acquires position information of the aircraft 2 from the position detector 24 via the aircraft controller 12, and acquires position information of the mobile terminal 50 from the mobile terminal 50 via the communication unit 15. Further, the video processor 51 acquires attitude information of the aircraft 2 from the attitude detector 25 via the aircraft controller 12. The video processor 51 identifies the vehicle 1 and a user 70 (user carrying the mobile terminal 50) in a captured video 60 (FIG. 8) captured by the photographing unit 22 of the aircraft 2 based on the position information of the vehicle 1, the aircraft 2, and the mobile terminal 50 and the attitude information of the aircraft 2. Further, the video processor 51 identifies a sidewalk, a pedestrian crossing, a roadway, a parking frame, and the like in the captured video 60 by analyzing the captured video 60. By prioritizing the sidewalk and the pedestrian crossing, the video processor 51 derives a recommended route for the user 70 to walk from a current position to a parking position of the vehicle 1. The video processor 51 superimposes a route indication graphic 63 indicating the recommended route on the captured video 60 by an augmented reality (AR) technology.

The proximity detector 52 detects proximity of the user 70 to the vehicle 1 by observing a time-series change of a position of the mobile terminal 50 with respect to a position of the vehicle 1 based on the position information of the vehicle 1 and the mobile terminal 50. The proximity detector 52 detects that the user 70 is in proximity to the vehicle 1 when a distance between the vehicle 1 and the mobile terminal 50 is less than a predetermined value (several tens of meters, for example, 30 m).

Figure 5:
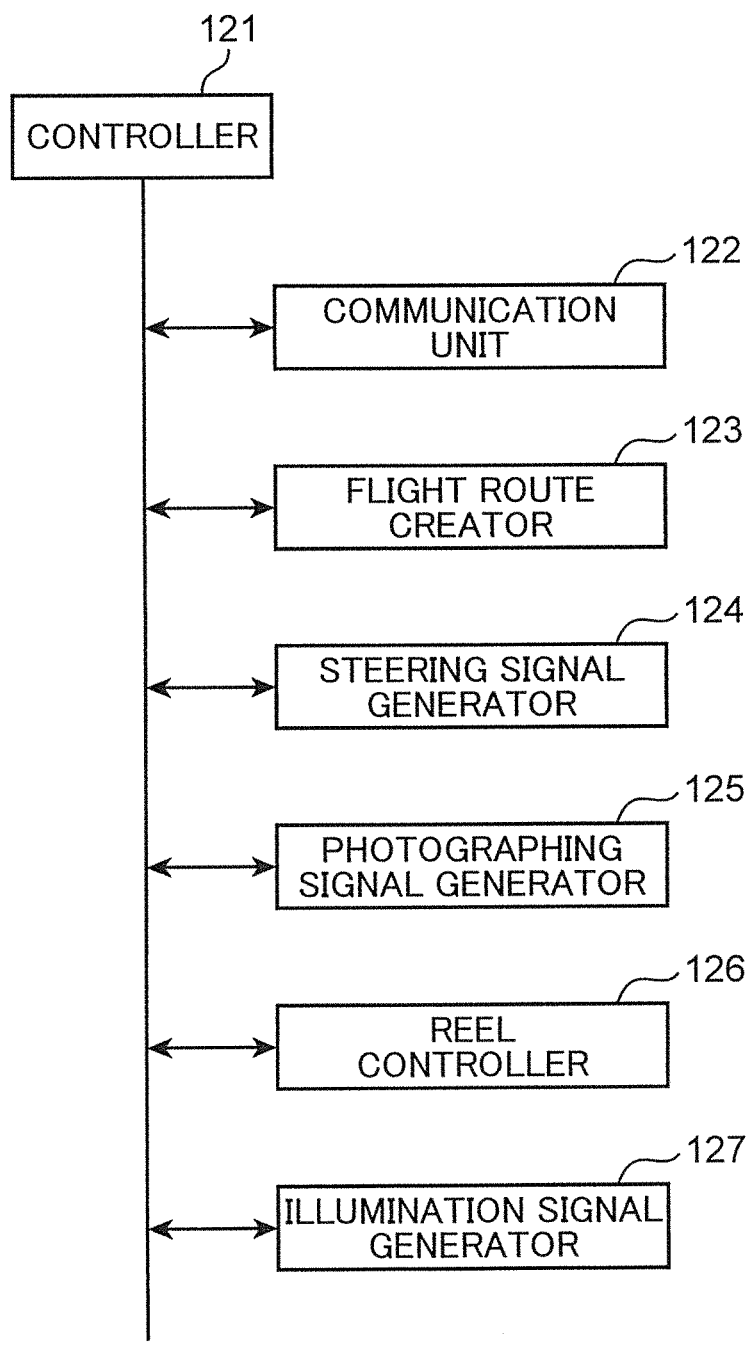
FIG. 5 is a block diagram showing a functional configuration of an aircraft controller.

FIG. 5 is a block diagram showing a functional configuration of the aircraft controller 12. As shown in FIG. 5, the aircraft controller 12 has a communication unit 122, a flight route creator 123, a steering signal generator 124, a photographing signal generator 125, a reel controller 126, and an illumination signal generator 127. Further, the aircraft controller 12 has a controller 121 that controls operations of these processors.

The communication unit 122 performs bidirectional data communication with the communication unit 21 of the aircraft 2 described above by a short-range wireless communication system such as Bluetooth (registered trademark). The communication unit 122 receives the video data, the position data, and the attitude data transmitted from the communication unit 21 in the aircraft 2.

The flight route creator 123 acquires the position information of the vehicle 1 from the GPS receiver 148 of the vehicle information detector 14, and acquires the position information of the mobile terminal 50 from the mobile terminal 50 via the communication unit 15. The flight route creator 123 derives a photographing position for capturing a video including both the vehicle 1 and the user 70 in an identical frame simultaneously, based on the position information of the vehicle 1 and the mobile terminal 50. The flight route creator 123 creates, as a flight route, the shortest route for moving and flying the aircraft 2 from the current position of the vehicle 1 to the photographing position.

The steering signal generator 124 generates a steering signal for flying the aircraft 2 along the flight route created by the flight route creator 123 based on the video data, the position data, and the attitude data received by the communication unit 122.

The photographing signal generator 125 generates a photographing start signal for the photographing unit 22 of the aircraft 2 to start photographing and a photographing stop signal for stopping the photographing in accordance with the flight condition of the aircraft 2.

The reel controller 126 controls the windup reel 19. Specifically, the reel controller 126 controls feed and collection of the tether 4 by driving the rotating shaft by the motor such that an appropriate amount of the tether 4 according to the flight condition of the aircraft 2 is fed from the rotating shaft of the windup reel 19.

The illumination signal generator 127 generates an illumination signal for causing the illumination unit 26 of the aircraft 2 to emit a predetermined notification illumination (for example, continuously emit high-intensity flash light).

The controller 121 transmits the steering signal generated by the steering signal generator 124, the photographing start signal and the photographing stop signal generated by the photographing signal generator 125, and the illumination signal generated by the illumination signal generator 127 from the communication unit 122 to the aircraft 2 in real time.

Figure 6:
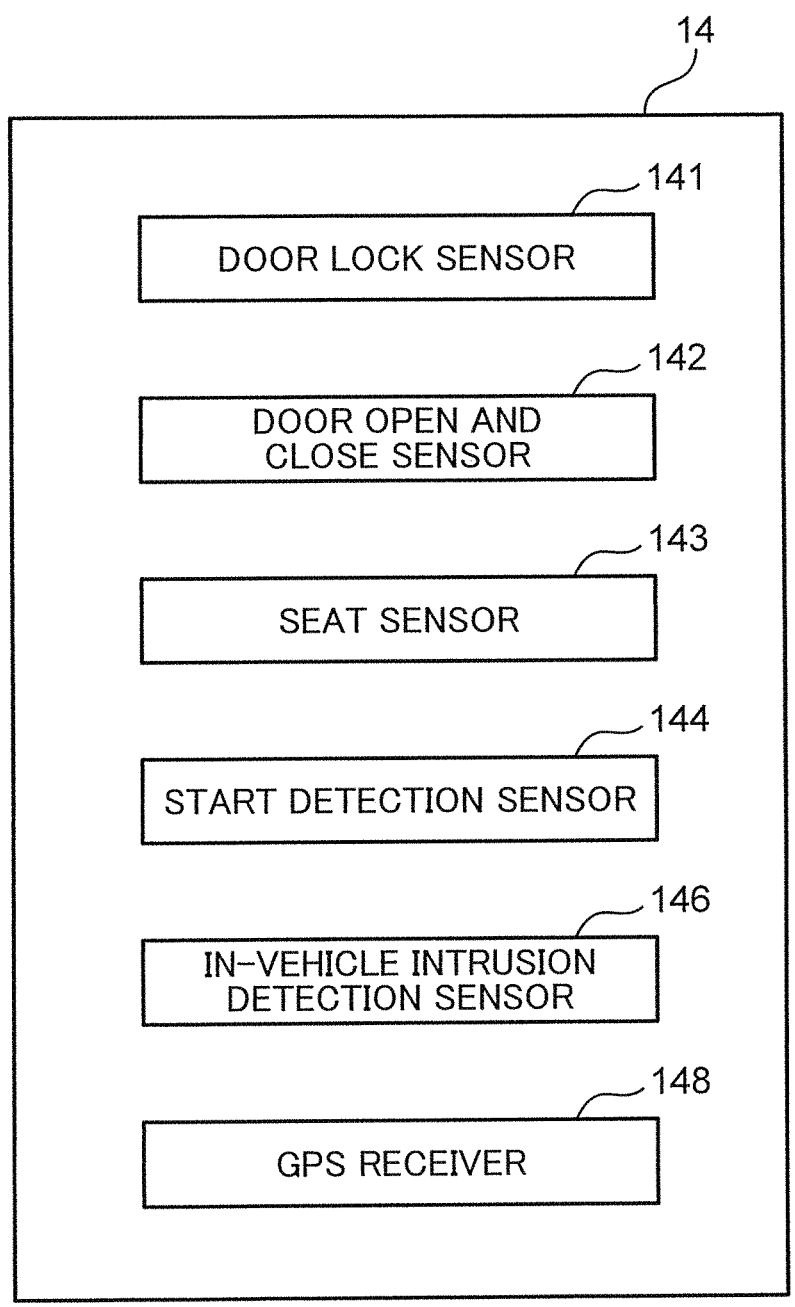
FIG. 6 is a diagram showing a functional configuration of a vehicle information detector.

FIG. 6 is a diagram showing a functional configuration of the vehicle information detector 14. As shown in FIG. 6, the vehicle information detector 14 includes a door lock sensor 141, a door open and close sensor 142, a seat sensor 143, a start detection sensor 144, an in-vehicle intrusion detection sensor 146, and the GPS receiver 148.

The door lock sensor 141 detects a locked state and an unlocked state of doors of the vehicle 1. The door open and close sensor 142 detects an open state and a closed state of the doors of the vehicle 1. The seat sensor 143 detects a seating state of a person on a seat of the vehicle 1. The start detection sensor 144 detects a start state and a stop state of a driving force generation device (engine, travel motor, or the like) of the vehicle 1 by an ignition sensor or by detecting a turned-on state and a turned-off state of a relay switch connecting the battery and a travel motor. The in-vehicle intrusion detection sensor 146 monitors inside of the vehicle 1 which is parked as a monitoring area and detects presence or absence of an intruder in the monitoring area. The GPS receiver 148 identifies the current position of the vehicle 1 based on a GPS signal received from a GPS satellite, and outputs the position information indicating the current position.

Figure 7:
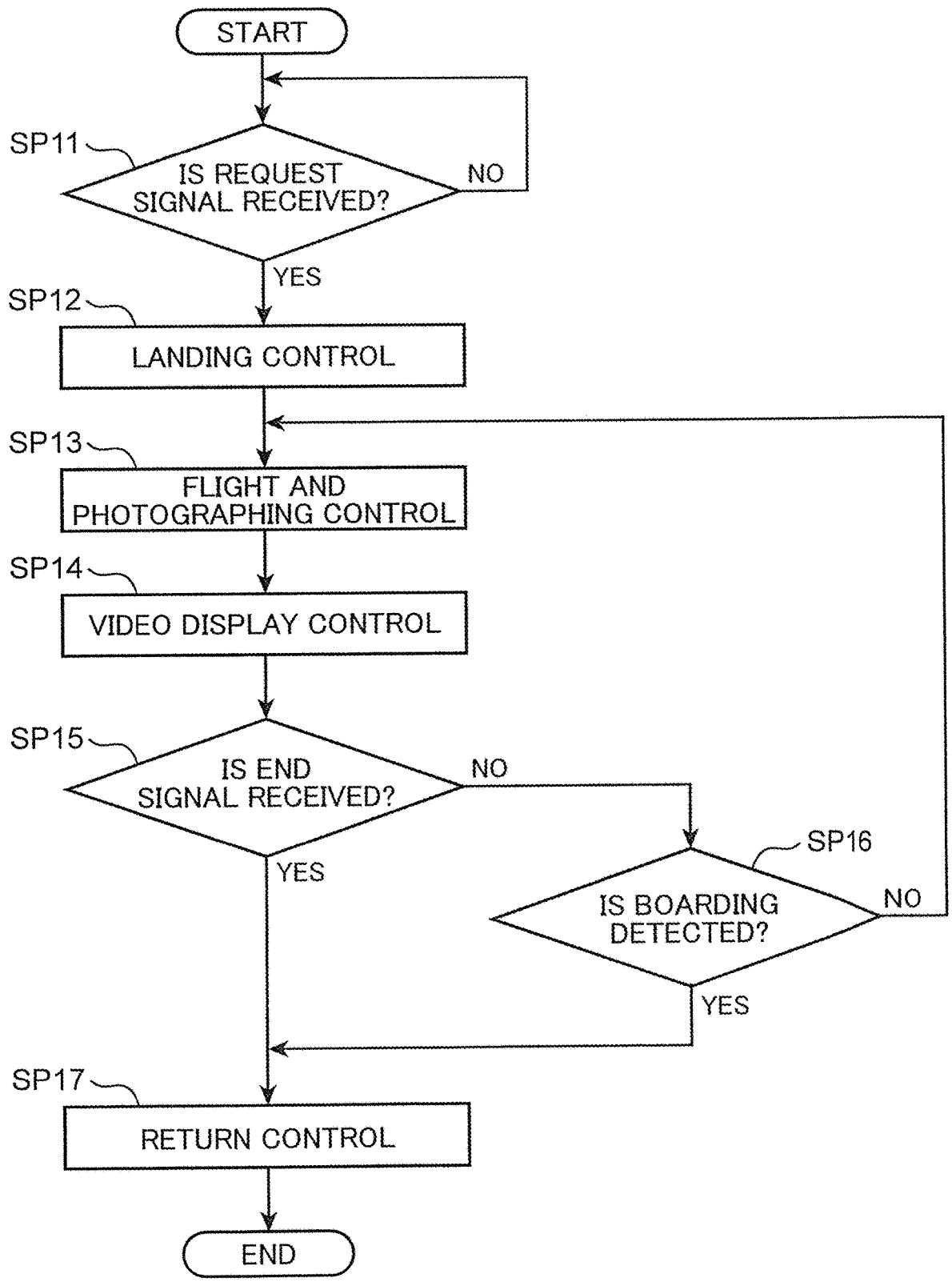
FIG. 7 is a flowchart of a control flow of parking position notification control performed by a controller of the vehicle.

FIG. 7 is a flowchart of a control flow of parking position notification control performed by the controller 10 of the vehicle 1. The controller 10 performs this control flow when the vehicle 1 is parked in a large parking lot having a certain area or more, such as a parking lot in a large commercial facility. The controller 10 detects that the current position of the vehicle 1 is in the parking lot based on the position information output from the GPS receiver 148. Specifically, the controller 10 detects that the vehicle 1 is parked when the start detection sensor 144 detects that the driving force generation device of the vehicle 1 is stopped, the in-vehicle intrusion detection sensor 146 detects that the inside of the vehicle 1 is unattended, and the door lock sensor 141 detects that all the doors of the vehicle 1 are locked.

When the user 70 carrying the mobile terminal 50 forgets the parking position of the vehicle 1 in the vast parking lot, transmission of a position notification image can be requested to the vehicle 1 by operation input from a touch screen of the mobile terminal 50 or the like. When the user 70 requests this transmission, a request signal is transmitted from the mobile terminal 50 to the vehicle 1.

In step SP11, the controller 10 determines whether the communication unit 15 has received the request signal from the mobile terminal 50.

If the communication unit 15 does not receive the request signal (step SP11: NO), the controller 10 repeatedly executes a process of step SP11.

When the communication unit 15 receives the request signal (step SP11: YES), then in step SP12, the controller 10 causes the aircraft controller 12 to perform takeoff control of the aircraft 2. First, the battery controller 11 starts supplying electric power from the battery 18 to the aircraft 2 via the tether 4. Next, the steering signal generator 124 generates a steering signal for takeoff of the aircraft 2 from the landing platform 3. After that, the communication unit 122 transmits the steering signal to the aircraft 2. Then, the communication unit 21 in the aircraft 2 receives the steering signal transmitted from the communication unit 122 in the vehicle 1. Subsequently, the drive unit 23 starts control for takeoff of the aircraft 2 by driving the propellers 113 based on the steering signal. As a result, the aircraft 2 takes off from the landing platform 3.

Next, in step SP13, the controller 10 causes the aircraft controller 12 to perform flight control and photographing control of the aircraft 2. First, the flight route creator 123 derives a photographing position for capturing a video including both the vehicle 1 and the user 70 in an identical frame simultaneously, based on the position information of the vehicle 1 and the mobile terminal 50, and creates a flight route to move the aircraft 2 to that photographing position. Next, the steering signal generator 124 generates a steering signal for moving the aircraft 2 to the photographing position along the flight route. After that, the communication unit 122 transmits the steering signal to the aircraft 2. Then, the communication unit 21 in the aircraft 2 receives the steering signal transmitted from the communication unit 122 in the vehicle 1. Subsequently, the drive unit 23 drives the propellers 113 based on the steering signal. As a result, the aircraft 2 flies along the flight route to the photographing position, and then maintains the photographing position by hovering. Further, the photographing signal generator 125 generates the photographing start signal for causing the photographing unit 22 of the aircraft 2 to start photographing. The photographing start signal is transmitted from the communication unit 122 to the aircraft 2, whereby the photographing unit 22 starts photographing with the camera 112. The video data of the captured video 60 captured by the camera 112 is transmitted from the communication unit 21 to the vehicle 1.

In step SP13, the controller 10 may cause the illumination signal generator 127 to generate an illumination signal for emitting the notification illumination. The illumination signal is transmitted from the communication unit 122 to the aircraft 2, whereby the illumination unit 26 of the aircraft 2 irradiates the user 70 with the notification illumination (light). As a result, the user 70 can visually recognize the aircraft 2 even from a distance easily.

Next, in step SP14, the controller 10 performs video display control for displaying the captured video 60 on the mobile terminal 50. The controller 10 transfers the video data received from the aircraft 2 to the communication unit 15, and the communication unit 15 transmits the video data to the mobile terminal 50. As a result, the captured video 60 captured by the camera 112 of the aircraft 2 is displayed on the display unit 55 of the mobile terminal 50. The video data output from the photographing unit 22 may be directly transmitted from the aircraft 2 to the mobile terminal 50 without going through the vehicle 1.

Figure 8:
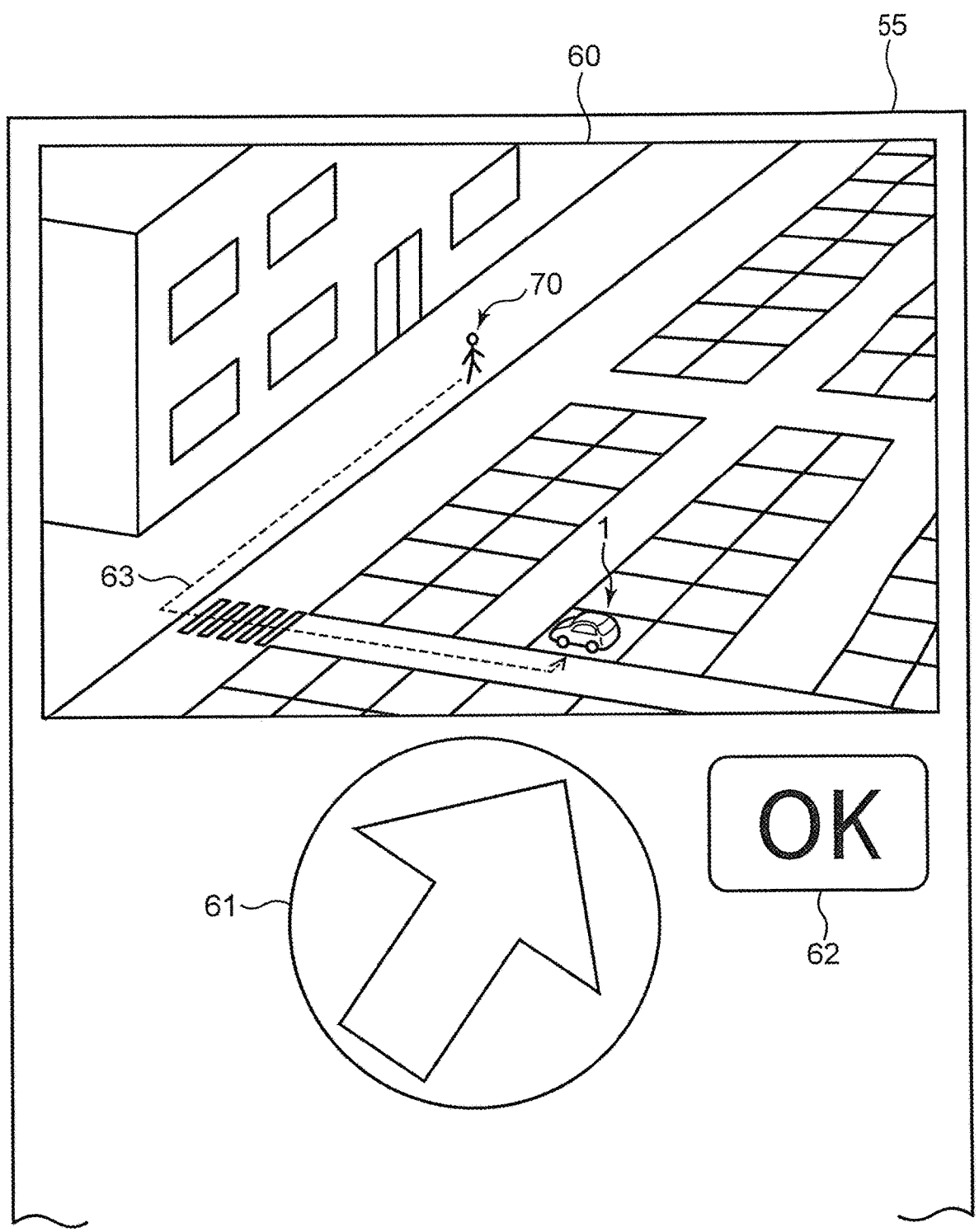
FIG. 8 is a diagram showing an example of a captured video displayed on a display unit of a mobile terminal.

FIG. 8 is a diagram showing an example of the captured video 60 displayed on the display unit 55 of the mobile terminal 50. The camera 112 of the aircraft 2 photographs the vehicle 1 and the user 70 from the photographing position diagonally above the vehicle 1, and thus the captured video 60 includes both the vehicle 1 and the user 70. The vehicle 1 and the user 70 in the captured video 60 may be highlighted by the video processor 51 with coloring, labeling, or the like in order to facilitate a distinction between the vehicle 1 and the user 70. Further, the route indication graphic 63 indicating the recommended route for the user 70 to walk from the current position to the parking position of the vehicle 1 by the video processor 51 is superposed on the captured video 60.

Further, the display unit 55 displays a direction indication graphic 61 indicating a direction of the parking position of the vehicle 1 with respect to the current position of the user 70. The direction indication graphic 61 shown in FIG. 8 indicates that the vehicle 1 exists in a diagonally forward right direction when viewed from the user 70 holding the mobile terminal 50 in front of the body and standing upright. The direction indication graphic 61 is generated by the mobile terminal 50 based on the position information of the vehicle 1 and the mobile terminal 50 and the attitude information of the mobile terminal 50.

Further, the display unit 55 displays a confirmation graphic 62 that is tapped by the user 70 when the user 70 discovers the vehicle 1. The confirmation graphic 62 is generated by the video processor 51 or the mobile terminal 50. By tapping the confirmation graphic 62, an end signal of the parking position notification control including a return command of the aircraft 2 is transmitted from the mobile terminal 50 to the vehicle 1.

In step SP15, the controller 10 determines whether the communication unit 15 has received the end signal of the parking position notification control from the mobile terminal 50.

If the communication unit 15 does not receive the end signal (step SP15: NO), then in step SP16, the controller 10 determines whether boarding of the user 70 on the vehicle 1 is detected. Specifically, the controller 10 detects that the user 70 has boarded the vehicle 1 upon detection of an opening or closing operation of a driver-side door of the vehicle 1 by the door open and close sensor 142 or upon detection of seating of a person on a driver's seat of the vehicle 1 after the opening or closing operation of the driver-side door by the seat sensor 143.

When the boarding of the user 70 on the vehicle 1 is not detected (step SP16: NO), the controller 10 repeatedly executes processes of steps SP13 to SP16.

Upon receipt of the end signal by the communication unit 15 (step SP15: YES) or upon detection of boarding of the user 70 on the vehicle 1 (step SP16: YES), then in step SP17, the controller 10 causes the steering signal generator 124 to generate a steering signal for flying the aircraft 2 from the current position toward the landing platform 3. The flight of the aircraft 2 is controlled by this steering signal transmitted to the aircraft 2, and the aircraft 2 returns to the landing platform 3.

When the aircraft 2 returns upon detection of the boarding of the user 70 on the vehicle 1, the controller 10 may forcibly recover the aircraft 2 by driving the rotating shaft of the windup reel 19 to rotate at high speed by the reel controller 126 instead of causing the steering signal generator 124 to generate the steering signal for returning the aircraft 2. This makes it possible to quickly recover the aircraft 2.

Next, the photographing signal generator 125 generates the photographing stop signal for stopping photographing for the photographing unit 22 of the aircraft 2. The photographing stop signal is transmitted to the aircraft 2, and the photographing unit 22 stops photographing by the camera 112. After that, the battery controller 11 stops the power supply from the battery 18 to the aircraft 2.

In the parking position notification system according to the present embodiment, the controller 10 causes the vehicle 1 to fly the aircraft 2 from the vehicle 1 when the vehicle 1 is parked in the parking lot, and causes the photographing unit 22 of the aircraft 2 to capture the captured video 60 (position notification image), and displays the captured video 60 on the display unit 55 of the mobile terminal 50. The user 70 carrying the mobile terminal 50 confirms the captured video 60 displayed on the display unit 55 of the mobile terminal 50 and identifies a building or the like that serves as a mark in a periphery of the vehicle 1. Thus, the user 70 can determine the parking position of the vehicle 1. As a result, when the vehicle 1 is parked in a large parking lot, it is possible to reliably notify the user 70 of the parking position of the vehicle 1.

Further, in the captured video 60, both the vehicle 1 and the user 70 are simultaneously included in the frame. Therefore, the user 70 carrying the mobile terminal 50 confirms the captured video 60 displayed on the display unit 55 of the mobile terminal 50 and grasps a relative positional relationship between the user 70 and the vehicle 1. Thus, the user 70 can easily determine the parking position of the vehicle 1.

Further, the direction indication graphic 61 indicating the direction of the parking position of the vehicle 1 with respect to the current position of the user 70 is added to the captured video 60. Therefore, the user 70 carrying the mobile terminal 50 confirms the captured video 60 displayed on the display unit 55 of the mobile terminal 50 and the direction indication graphic 61. Thus, the user 70 can easily determine the parking position of the vehicle 1.

Further, the route indication graphic 63 indicating the recommended route from the current position of the user 70 to the parking position of the vehicle 1 is added to the captured video 60. Therefore, the user 70 carrying the mobile terminal 50 confirms the captured video 60 displayed on the display unit 55 of the mobile terminal 50 and the route indication graphic 63. Thus, the user 70 can easily reach the parking position of the vehicle 1.

Further, the controller 10 performs the parking position notification control on condition that a request for transmission of the position notification image is received from the mobile terminal 50. This can prevent the parking position notification control from being unnecessarily performed when the user 70 remembers the parking position of the vehicle 1.

Further, the controller 10 returns the aircraft 2 to the vehicle 1 upon detection of boarding of an occupant on the vehicle 1. This makes it possible to return the aircraft 2 before the vehicle 1 starts traveling and thereby avoid in advance a situation in which the aircraft 2 comes into contact with an obstacle or the like in the periphery after the vehicle starts traveling.

<Modification>

In the above embodiment, the controller 10 performs the takeoff control of the aircraft 2 on condition that the communication unit 15 receives the request signal from the mobile terminal 50. However, the present invention is not limited to this example. The controller 10 may perform the takeoff control of the aircraft 2 on condition that the proximity detector 52 detects proximity of the user 70 to the vehicle 1 while the vehicle 1 is parked.

The proximity detector 52 detects that the user 70 is in proximity to the vehicle 1 when the distance between the parked vehicle 1 and the mobile terminal 50 is less than a predetermined value (several tens of meters, for example, 30 m) based on the position information of the vehicle 1 and the mobile terminal 50. Upon detection of proximity of the user 70 to the vehicle 1 by the proximity detector 52, the controller 10 performs the takeoff control of the aircraft 2 regardless of whether the communication unit 15 has received the request signal from the mobile terminal 50 (step SP12).

In this modification, the controller 10 performs the parking position notification control on condition that the proximity of the user 70 to the parked vehicle 1 is detected. This eliminates the need for manual operation input by the user 70 to the mobile terminal 50 for starting performance of the parking position notification control, thereby improving convenience of the user 70.

SUMMARY

A vehicle parking position notification system according to one aspect of the present invention includes an aircraft mounted on a vehicle, having a photographing unit, and configured to fly outside the vehicle, and a controller configured to control the aircraft, in which when a start condition determined in advance is satisfied while the vehicle is parked, the controller controls the aircraft to take off from the vehicle, controls the photographing unit to capture a position notification image including at least the vehicle and notifying a parking position of the vehicle, and controls the position notification image to be transmitted to a mobile terminal having a display unit and carried by a user outside the vehicle.

In this aspect, when a start condition determined in advance is satisfied while the vehicle is parked, the controller controls the aircraft such that the aircraft takes off from the vehicle, the photographing unit captures the position notification image, and the captured position notification image is transmitted to the mobile terminal carried by the user outside the vehicle. The user carrying the mobile terminal confirms the position notification image displayed on the display unit of the mobile terminal and identifies a building or the like that serves as a mark in a periphery of the vehicle. Thus, the user can determine the parking position of the vehicle. As a result, when the vehicle is parked in a large parking lot, it is possible to reliably notify the user of the parking position of the vehicle.

In the above aspect, the controller desirably controls the photographing unit to capture an image including both the vehicle and the user outside the vehicle simultaneously as the position notification image based on position information of the vehicle and position information of the mobile terminal.

In this aspect, the position notification image includes both the vehicle and the user outside the vehicle simultaneously. Therefore, the user carrying the mobile terminal confirms the position notification image displayed on the display unit of the mobile terminal and grasps a relative positional relationship between the user and the vehicle. Thus, the user can easily determine the parking position of the vehicle.

In the above aspect, a direction indication graphic indicating a direction of the parking position of the vehicle with respect to a current position of the user is desirably added to the position notification image.

In this aspect, the position notification image displays a direction indication graphic indicating a direction of the parking position of the vehicle with respect to the current position of the user. Therefore, the user carrying the mobile terminal confirms the position notification image displayed on the display unit of the mobile terminal and the direction indication graphic. Thus, the user can easily determine the parking position of the vehicle.

In the above aspect, a route indication graphic indicating a recommended route from the current position of the user to the parking position of the vehicle is desirably added to the position notification image.

In this aspect, the position notification image displays the route indication graphic indicating the recommended route from the current position of the user to the parking position of the vehicle. Therefore, the user carrying the mobile terminal confirms the position notification image displayed on the display unit of the mobile terminal and the route indication graphic. Thus, the user can easily reach the parking position of the vehicle.

In the above aspect, the aircraft desirably further has an illumination unit emitting light, and the controller desirably controls the illumination unit to emit the light to the user.

In this aspect, the controller controls the illumination unit of the aircraft to emit the light to the user. As a result, the user can visually recognize the aircraft even from a distance easily.

In the above aspect, the controller desirably performs the parking position notification control on condition that proximity of the user to the parked vehicle is detected.

In this aspect, under the start condition that proximity of the user to the vehicle being parked is detected, the controller controls the aircraft such that the aircraft takes off from the vehicle, the photographing unit captures the position notification image, and the position notification image is transmitted to the mobile terminal. This eliminates the need for manual operation input by the user for starting performance of the above control, thereby improving convenience of the user.

This application is based on Japanese Patent application No. 2020-087615 filed in Japan Patent Office on May 19, 2020, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle parking position notification system comprising:
an aircraft tethered to a vehicle by a tether that controls power supply from the vehicle to the aircraft, the aircraft including a camera, and being configured to fly outside the vehicle; and
a controller configured to control the aircraft,
wherein when a predetermined start condition is satisfied while the vehicle is parked, the controller is configured to
control the aircraft to take off from the vehicle while remaining tethered to the vehicle,
control the aircraft to be positioned such that the camera captures the vehicle and a user away from the vehicle simultaneously in an identical frame while remaining tethered to the vehicle,
control the camera to capture a position notification image including the vehicle and the user, the position notification image being indicative of a parking position of the vehicle, and control the position notification image to be transmitted to a mobile terminal having a display and carried by the user.

2. The vehicle parking position notification system according to claim 1, wherein the position notification image further includes a direction indication graphic indicating a direction of the parking position of the vehicle with respect to a current position of the user.

3. The vehicle parking position notification system according to claim 2, wherein the position notification image further includes a route indication graphic indicating a recommended route from the current position of the user to the parking position of the vehicle.

4. The vehicle parking position notification system according to claim 3, wherein
the aircraft further includes a light source, and
the controller is configured to control the light source to illuminate the user.

5. The vehicle parking position notification system according to claim 2, wherein the predetermined start condition is that the current position of the user to the vehicle is within a predetermined distance.

6. The vehicle parking position notification system according to claim 4, wherein the position notification image further includes a direction indication to graphic indicating a direction of the parking position of the vehicle with respect the current position of the user.

7. The vehicle parking position notification system according to claim 1, wherein the position notification image further includes a route indication graphic indicating a recommended route from a current position of the user to the parking position of the vehicle.

8. The vehicle parking position notification system according to claim 1, wherein
the aircraft further includes light source, and
the controller is configured to control the light source to illuminate the user.

9. The vehicle parking position notification system according to claim 1, wherein the predetermined start condition is that a current position of the user to the vehicle is within a predetermined distance.

10. The vehicle parking position notification system according to claim 2, wherein
the aircraft further includes a light source, and
the controller is configured to control the light source to illuminate the user.

11. The vehicle parking position notification system according to claim 2, wherein the predetermined start condition is that the current position of the user to the vehicle is within a predetermined distance.

12. The vehicle parking position notification system according to claim 3, wherein the predetermined start condition is that the current position of the user to the vehicle is within a predetermined distance.

13. The vehicle parking position notification system according to claim 6, wherein the position notification image includes a route indication graphic indicating a recommended route from the current position of the user to the parking position of the vehicle.

14. The vehicle parking position notification system according to claim 8, wherein the predetermined start condition is that a current position of the user to the vehicle is within a predetermined distance.

15. The vehicle parking position notification system according to claim 7, wherein the predetermined start condition is that the current position of the user to the vehicle is within a predetermined distance.

16. The vehicle parking position notification system according to claim 8, wherein the position notification image further includes a direction indication graphic indicating a direction of the parking position of the vehicle with respect to a current position of the user.

17. The vehicle parking position notification system according to claim 9, wherein the position notification image further includes a direction indication graphic indicating a direction of the parking position of the vehicle with respect to the current position of the user.

* * * * *